Nov. 20, 1928.

A. E. SPINASSE

1,692,585

METHOD OF AND APPARATUS FOR DRAWING GLASS

Original Filed Jan. 10, 1918    3 Sheets-Sheet 2

Patented Nov. 20, 1928.

1,692,585

UNITED STATES PATENT OFFICE.

ARTHUR E. SPINASSE, OF MOUNT VERNON, OHIO.

METHOD OF AND APPARATUS FOR DRAWING GLASS.

Application filed January 10, 1918, Serial No. 211,236. Renewed August 2, 1926.

My invention relates to an improved method of and certain apparatus for drawing glass objects, and is more particularly directed to the drawing of glass sheets or plates. The object of my invention is a process adapted to simplify and improve the method of producing continuous sheet glass, to provide adequate means of regulating and effecting production, to reduce the manufacturing cost and to improve the qualities of the product. My invention also involves specially designed means for carrying out my process.

The broad features resorted to in my present invention are to be found in my Patent No. 1,167,534, dated January 11, 1916, and in my application Serial No. 48,447, a division thereof, filed September 1, 1915, and references for disclosure of the broad features of local regulation, anchorage and segregation involved in this case, may be had to the above named patent and application.

One of the objects of my invention is the imposition of certain conditions of use and of methods of drawing glass articles, particularly continuous sheets, from a temperature regulated glass pool or stratum; it comprises segregating a pool or portion of glass from a mass of molten glass contained in a tank furnace, and consists in modifying and controlling the temperature of the walls of the segregating member at desired points with respect to the mass of molten glass and furnace heat, while said member is maintained immersed at suitable depth in said mass; whereby, the temperature and viscosity of the pool or portion of glass may be locally modified and controlled in suitable degree at desired or predetermined points, at or below the surface of the pool or portion of glass, to effect desired results.

It further consists in shielding and protecting at least the inner portion of the segregating member from the furnace heat and from the heat radiation of the highly fluid glass therein, thereby obtaining the essential relatively low temperature of the segregating member with respect to said heat and glass, which enables me to modify and regulate the temperature and viscosity of the segregated pool or portion of glass at desired points. It further consists in properly protecting the glass sheet from the melting heat of the furnace, enabling proper drawing to take place, which protection, with the means provided, consists in locally modifying and controlling the degree of shielding of the zone of the draw or sheet glass drawn, at desired or predetermined points, so as to obtain the desired effects and especially uniformity of thickness of walls of the sheet or glass articles drawn.

In my present glass sheet drawing process, I create a pool of glass of proper homogeneity in a mass of molten glass, by modifying and regulating its temperature and viscosity at desired points, preferably at points beneath the surface of the pool and as the glass approaches the surface or drawing area. I maintain immersed in the glass mass a segregating refractory member of special form, providing positive means to vary and regulate the temperature of its walls at desired points, and hence temperature and viscosity of the glass pool at such points. This enables me to establish in the segregating ring or member at desired places, points of anchorage to which the generating edges as such, of the sheet, may be held or be adherently drawn from the viscid glass fed at such points. I make the anchoring points small, so small as to, in some cases, extend only the thickness of the sheet or plate drawn, so that during draw, there is comparatively reduced tendency of the sheet to form thick and thin, causing the sheet to form with edges of approximately the same thickness as the sheet body portion, at times.

It is desirable to modify and regulate the condition of the anchoring points to effect this uniformity and to avoid the formation at or near these points of masses of glass differing in viscosity and texture from the glass of the main part of the segregated pool at the drawing line; in other words, I aim to produce for the sheet itself throughout its extent uniformity of condition, and to keep the sheet stretched laterally by means of the anchoring relation of the sheet edges forming glass portions, to the comparatively small anchoring points locally and precisely controlled to the end indicated. The sheet I form, is thus of substantially even thickness, texture and transparency throughout, and substantially even in width. The form and dimensions of the anchoring points and temperature regulation, control the intensity of the anchorage between said points and the viscid glass forming the sheet edges in adherent contact therewith. It also determines the intensity of the vertical stretching action at such points by the pull of the sheet edges and thus further regulates thickness and form of the sheet edges drawn.

In effecting my process I create proper conditions of thermal control between the segregating member and the top or drawing opening of the drawing furnace thereabove, so that the furnace may be kept at relatively high melting temperature to maintain purity of glass, and the zone where drawing takes place reduced to proper drawing temperature protected from said high temperature and from the heat of the surrounding molten glass within the furnace. Therefore it comprises properly shielding the zone of draw from the comparatively high temperature within the furnace, so that the relative temperatures of either the furnace or drawing zone may be modified or regulated as required at desired points, and will not interfere with the proper operation of one with respect to the other during drawing; also, to properly protect the segregated glass portion and inner part of the refractory ring or member from said furnace heat, effecting the necessary temperature conditions between the member and the segregated portion of glass in their various portions; permitting proper relative temperature regulation of the member, and viscidity of the segregated portion of glass at different points or depths with respect to the furnace heat during drawing. This enables me to obtain the required viscidity and adherence of the marginal portion of glass from which the sheet edges are drawn, at points adjacent to or in contact with the temperature regulated walls of the segreating member at or beneath the surface, causing each successive portion of the sheet drawn to become drawn adherent to said viscid glass and walls of the member. I am thus enabled to obtain an anchorage sufficient to maintain the width of the sheet, and, what is important, to resist material shrinkage of the sheet portion between the edges during drawing, thus obtaining a glass sheet free from lines or similar blemishes.

I wish to emphasize that it is a drawing temperature at the zone of draw which is necessary, not a tank furnace temperature. It is a proper reduced relative drawing temperature of the segregating member, and of the zone of draw with respect to the melting temperature of the tank furnace which is necessary, to render possible the drawing of a glass sheet; and so that the refractory segregating member may be maintained at the essential relatively low temperature to cause it to affect and control the temperature or viscidity of the segregated portion of glass at desired points.

I also protect the initial portion of the sheet drawn, from the furnace heat, until it passes out from the drawing chamber into a leer, permitting heat from the drawing zone to pass upwardly therein, preventing sudden chill of the sheet which thus anneals by its own heat as it passes out above the drawing chamber.

Further, in carrying out my improved method for drawing glass sheets, I make use of a segregating element of a form adapted to protect the main body of glass, from the cooling effect of the atmosphere, and which is at the same time constructed with passages, channels or pockets leading into contact with, or rather into contiguity to the surface or substrata of the segregated glass at various or desired points, and in which heating or cooling mediums, pipes or agents operate or circulate to affect and control the temperature of certain parts thereof and of the segregated portion of glass.

Figure 1:
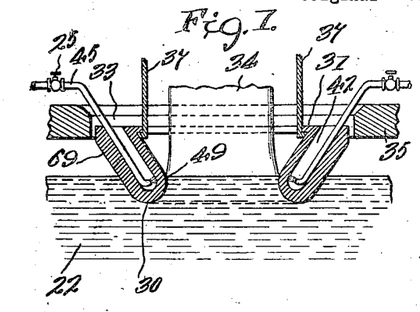
Figure 1 is a transverse vertical section showing a form of ring or device used in connection with a glass drawing tank.

Figure 1 shows the drawing member 69, a ring preferably oblong in contour and decreasing in diameter toward its rounded lower edge 30. Hooks 37 releasably engage rim 31 of the member, so that it may be elevated to suitable position for drawing, through or from opening 33 provided in the furnace top 35. The member is maintained in suitable drawing position with respect to the mass of molten glass 22, to segregate a pool of glass 39 from which the glass sheet 34 may be drawn as shown. The member is provided with narrow recesses 42, in which project pipes 45 discharging a temperature affecting medium interiorly and precisely at the points of sheet edges anchorage 49. Temperature of the walls of the member at such points therefore, may be increased or decreased whereby to determine the degree of viscidity and adherency of the glass from which the sheet edges are drawn, to the walls of the member at points 49. This further prevents narrowing of the glass sheet 34, which is being drawn from the deep glass pool 39, while it also determines the intensity of the anchorage of the glass and thickness of the sheet edges drawn.

Figure 2:
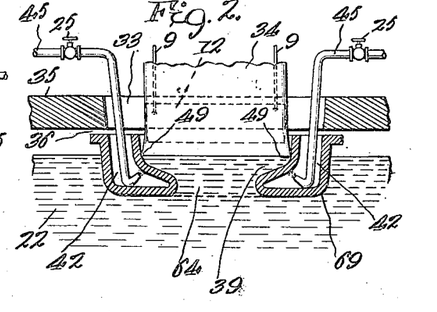
Figures 2, 3, 4, 5 and 6 are similar transverse vertical sectional views of other forms.

In Figure 2 is shown partly immersed in the molten glass mass 22, what may be termed a double-walled refractory pot or float member 69; the air chamber 42 extending partly beneath the segregated glass pool 39 which is being fed into the pot through aperture 64, and from which sheet 34 is being drawn. I regulate the temperature of the member, by adjusting pipes 45 in the chambers 42, to apply temperature affecting medium such as air, ignited gas, or both, and hence regulates the viscidity of the segregated glass in suitable degree or place for drawing, controlling valves 25 being provided to the pipes 45 for this purpose.

In this structure the pipes 45 rest upon the bottom of the chambers, and are held in any suitable manner to maintain the float immersed to proper drawing position. I prefer to leave an adjusted reduced space 36 beneath the cover 35, so that the zone of draw and the glass sheet 34 are sufficiently shielded from the furnace heat to permit drawing and also to maintain proper drawing temperature condition.

I provide shade stones 12 to further regulate drawing temperature, said shade stones being operated by any suitable means attached to cable 29 for vertical movements through drawing opening 33. These shade stones are adapted to take position adjacent to the glass pool 39 on each side of the glass sheet 34, which sheet is being drawn from said pool by means described in Figure 8. In Figure 2 the temperature affecting medium, such as air, is applied as shown in the chambers beneath the shallow depth portion of the pool or stratum 39, the sheet edges being drawn from the viscid glass adherent to the temperature regulated anchoring walls of the refractory segregating member as at 49. Thus I am enabled to increase or decrease the temperature of the walls of the member at such points, and hence I may also regulate the viscidity of the glass pool from beneath the surface of the glass mass. This is important, as it enables me, irrespective of any other condition, to modify or regulate the viscidity of the pool at any selected points, and in degree sufficient to prevent narrowing of the sheet drawn. The anchorage is also important, and I adjust temperature so that each successive portion of the sheet edges at 49 is drawn sufficiently anchored to the adherent viscid glass fed to the temperature controlled walls of the refractory member 69, so as to resist the lateral contraction of the cooling drawn sheet of glass. Therefore a certain lateral stretching action of the sheet is obtained, resulting in the production of a glass sheet of even width and proper thickness, and of great transparency.

Figure 3:
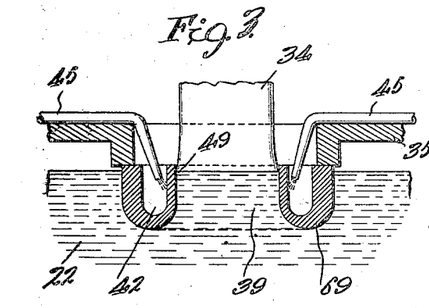

In Figure 3, I show the glass sheet 34 drawn from a deep glass pool 39, separated from the molten glass mass 22 by a hollow walled refractory ring 69 preferably oblong in contour. The ring is maintained properly immersed by top 35, pipe 45 being set to operate in the pockets 42 as heretofore described.

Figure 4:
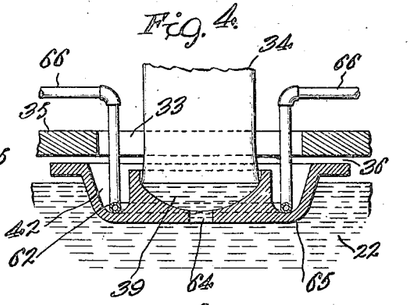

In Figure 4, the sheet is drawn from a shallow glass pool 39, which outwardly decreases in depth, and is segregated into a self-feeding hollow-walled pot 65 having a feed aperture 64. The edges of the sheet, as shown, are drawn from the extreme adherent viscid glass of the pool. The groove 42 of the float, in this case is engaged by a continuous fluid cooled pipe 62 having branches 66 for holding the float in desired drawing position. Feed aperture 64 is sufficiently large to permit a constant flow of molten glass into the shallow pot and yet sufficiently small to knead and amalgamate the inflowing glass. In this case I show a flat sheet glass 34 being drawn from the commingled pool of glass 39.

Figure 5:
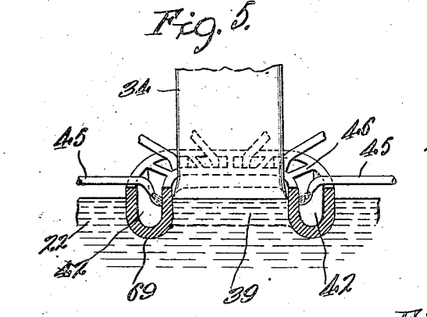

In Figure 5, the sheet is drawn from the pool 39, surrounded by an oblong refractory hollow-walled ring 69, partly immersed in the glass mass 22. Partitions 46 divide a series of pockets 42 within the walls of the ring, pipes 45 may be adjusted in the pockets as shown, to apply temperature affecting medium to obtain the various local temperatures, for the sheet drawn as required.

Figure 6:
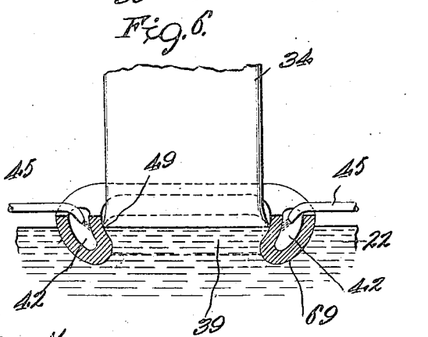
Figure 7:
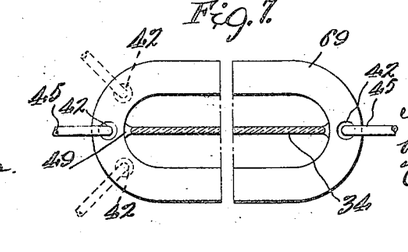
Figure 7 is a top plan view of the oblong form of ring shown in Figure 6.

In Figures 6 and 7, I show the sheet 34 drawn from the glass pool 39 segregated within an oblong refractory ring member 69, said member having narrow channels 42 extending into the end portions of the wall thereof, and precisely at the points of anchorage 49 where the sheet edges take form during draw. These small reduced channels may be vertical or in any degree of inclination; pipes 45 are projected at desired points therein, and supply a temperature affecting medium adjacent to anchoring points 49. This affords means to obtain proper temperature of walls, and requires viscidity and adherence of the edge producing portions of glass at such points. The comparatively diminutive channels and points of anchorage assist in obtaining sheet edges of uniform thickness; for this purpose also I may use additional channels as indicated by dotted lines.

Figure 8:
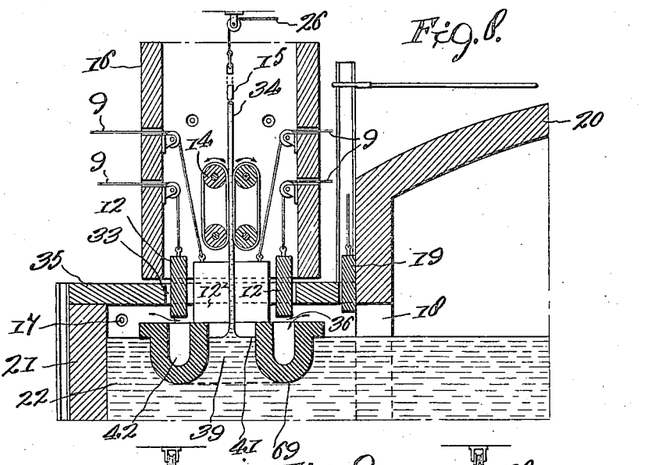
Figure 8 is a transverse sectional side view, and Figure 9 a transverse front vertical sectional view of the drawing device in connection to a drawing tank.
Figure 9:
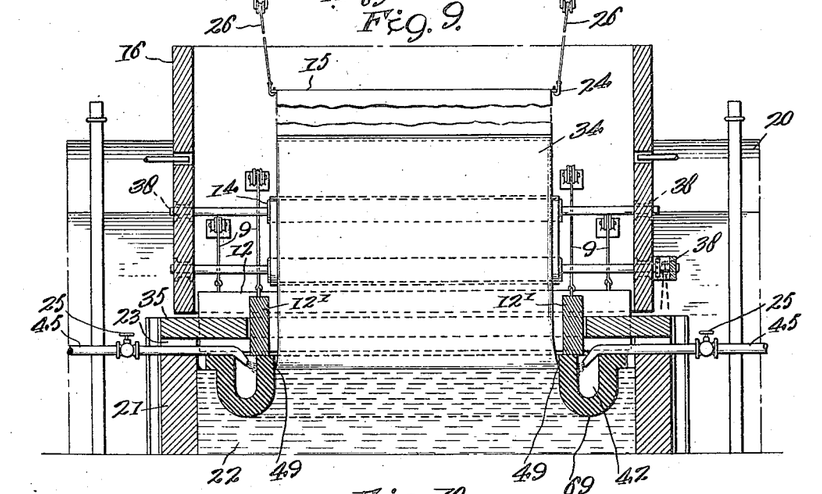
Figures 13, 21:
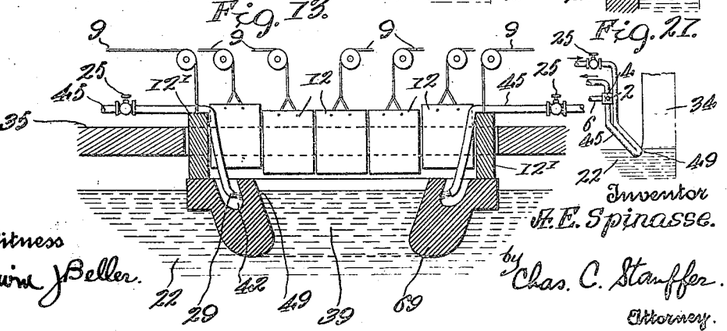
Figure 13 is a view showing a series of shield stones each adjustable so as to vary temperature locally, and thus regulate drawing temperature.

In Figures 8 and 9, I show a preferred and more complete structure for carrying out my method of drawing glass sheets. In Figure 8, 20 is the melting tank furnace, 21 a drawing chamber projecting therefrom and supplied with molten glass 22 from said tank, said chamber being maintained at high temperature by heating means 17, and by furnace heat passing through space 18 which may be regulated by lowering damper 19. 35 is the top of the drawing chamber having a drawing opening 33; 69 is a hollow-walled oblong refractory ring or member maintained immersed in the glass by means of shade stones 12′, which stones, with their companion shade stones 12, surround the drawing zone or area and may be raised or lowered by means of cable 9 connected to suitable lowering means. The ring in this case is maintained immersed with the spaces 42 within the glass bath 22, whereby a pool or stratum of homogeneous glass 39, is separated from the surrounding mass of glass for drawing, and protected from excess furnace heat by side shade stones 12 which may be in any number, as shown in Figure 13. The shade stones may be raised and lowered individually, to admit or exclude furnace heat from the zone of the draw, by varying space 36 at desired points as required, and, as indicated, the shade stones may also be lowered to take position within space 42 of the segregating member to shield the zone of the draw and regulate temperature when desired. In drawing, the bait 15 is immersed into the glass pool or stratum 39, and raises a glass sheet 34 which now may be drawn continuously by frictional draft upon its surfaces, from suitable drawing mechanism such as rolls, belt or carrier 14, as shown. Said carriers may be in any number and operated by any suitable means and source of power, the sheet or plate 34 passing upwardly into a leer 16 of suitable form.

As shown in Figure 9, in the walls of the drawing chamber, I provide opening 23 into which I project pipes 45 having controlling valve 25, and directing a temperature affecting medium such as air or burning gas, into the end chambers 42 of the segregating member, whereby I am enabled to regulate temperature locally and obtain proper viscid glass anchorage at points 49 where the sheet edges drawn take form. In starting the draw the bait 15, by means of cable 26, is lowered between the rolls 14 until slightly immersed in glass pool 39, and with its extreme portions at points 49; the bait is then raised drawing a glass sheet 34 of uniform width, and with each successive portion of the sheet edges drawn from the adherent viscid glass in contact with the temperature regulated walls of the segregated member at points 49. When sufficiently elevated the sheet is cut laterally by any well known means, the bait removed from the hooks 24, and the drawing may become continuous. As described, the sheet edges are drawn from the glass in contact with or near to the walls of the segregating member at points 49, but, as shown, I prefer to draw the sheet with both of its faces, drawn from the glass properly distanced from opposite walls 41 of the member, to avoid defects caused by drawing in too close proximity thereto. Further, as stated, these walls are maintained at proper temperature to maintain proper viscidity and transparency of glass, and to obtain the production of a glass sheet of desired thickness of wall throughout.

Figure 10:
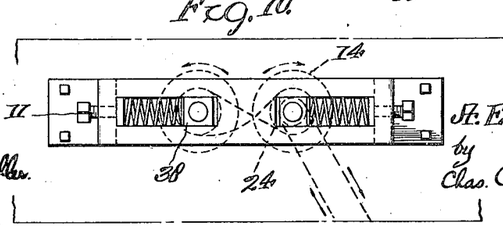
Figure 10 is an enlarged detail view showing the flexible form of driving gear used.

In Figure 10, I show means for effecting movement of the rolls or carriers 14. A crossed chain to toothed wheel 24, or other suitable gear mechanism, drives the rolls or belts 14 on opposite faces of the sheet in directions as pointed out by the arrows. The rolls on one side at least, are mounted in spring pressed bearing blocks 38, so that they may yield to any irregularities of the glass surface as needed. Sufficient frictional draft upon the sheet drawn being obtained by means of screws of pressure 11. The shaft of the rolls, as shown, are extended through the walls of the leer 16, in which walls may be found the movable bearing blocks referred to above.

Figure 11:
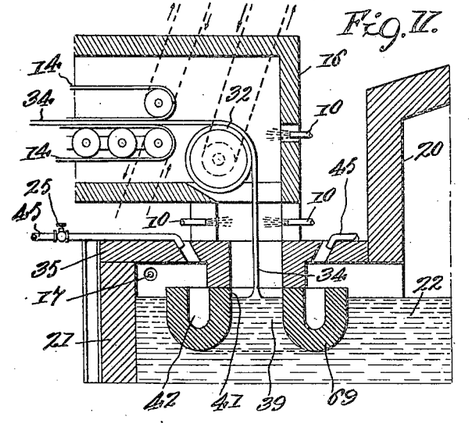
Figures 11 and 12 are transverse side and front vertical sectional views showing a modification of Figures 8 and 9.
Figures 12, 18, 19, 20:
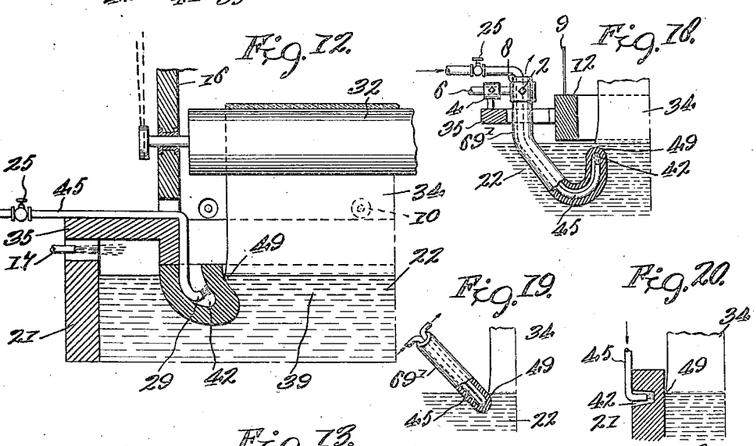
Figures 18, 19, 20 and 21 further illustrate the invention, and parts or modifications which may be used.

Figures 11 and 12 are modification views of Figures 8 and 9, respectively, showing the spaces 42 in the walls of the member 69, at points opposite to both faces of the drawn sheet 34 entirely exposed to the furnace heat; nozzle of pipes 45 being also disposed to direct heat therein, so that walls 41 on both sides of the glass pool 39 and sheet drawn, may be maintained properly heated to avoid marring or devitrification of the glass by undue cooling at such points. It will be understood, that the chamber or pockets 42 may be of any suitable dimension, and may not project within the mass of molten glass 22. In this case sheet 34 is being drawn through an atmosphere maintained at proper temperature by means of burners 10, the sheet also is being bent over a roll 32, and passes out horizontally through a properly heated leer 16, upon or between frictional draft carriers 14 of suitable form, the sheet being cut in desired sections at the end of the leer and removed. I show the edges of the sheet drawn at points 49, temperature of the walls of the member and of the glass fed at such points being regulated or maintained as required, by means of discharge nozzle 29 of pipes 45 within the more or less exposed incurved pockets 42 at such points. The sheet 34 is thus drawn of uniform width and with the edges thereof formed in proper thickness and at such points.

Pipe or conduits 45 may be arranged to convey temperature affecting fluid or medium to any portions of the walls of the member holding the glass pool so that, by conduction through or radiation from said walls, to affect the temperature of the glass at such points, and render the glass homogeneous.

I prefer to equalize temperature to obtain uniform viscidity throughout the pool of glass from which the glass sheet is drawn, thereby obtaining uniformity of product and maintain transparency.

In Figure 13 I show a preferred assemblage of parts, affording means for regulating temperature of the glass pool and sheet drawn, from above the surface of the glass, by properly exposing or shielding said pool and sheet to or from the furnace heat at desired points. The ring or segregating member 69 being in some respects similar to that described in Figures 6 and 7. The walls of the member project above the surface of the glass, and the space or interior thereof gradually decreases in diameter toward the lower opening or submerged wall portions. Said member having in its end wall portions two small pockets 42 near the surface of the glass, in which nozzles of pipes 45 project adjacent to the anchoring or sheet edge glass forming points 49, valves 25 being used to apply temperature affecting medium at such points in desired degree to control temperature of the walls, and viscidity and adherence of the glass at such points. I provide a series of sectional shade stones 12 and 12' adapted to surround the drawing zone or glass pool 39, said shades being individually movable vertically by means of suitably connected cables 9, and afford means to either exclude or locally admit heat from the furnace in desired degree and at desired points, enabling thus, proper temperature conditions, control of the pool or zone of the draw locally or throughout. As indicated, the sections 12' are lowered to rest upon and steady ring 69 at suitable depth in the glass bath 22, thereby segregating a pool 39 of desired depth, and with the surface thereof brought in proper close relation to the temperature regulating pockets 42. Other shades of the series may be used for this purpose.

The novelty and utility of this shield arrangement will be apparent, the usual warping and breakage of a continuous refractory mass under high and varying temperature is not only avoided, but it affords means whereby the parts may be interchanged or renewed locally as required without discarding the whole apparatus. Further temperature regulation of the object drawn, at desired local points and in desired degree becomes possible, resulting in the production of drawn objects of uniform thickness of walls and properly tempered. In this case I show the end shades 12 raised slightly higher than the companion members toward the center of the sheet, thus compensating for greater cooling tendencies at such points, and equalizing temperature of the drawing zone or sheet drawn as required.

It will be understood that this shield arrangement may be used with the same advantages, in the manufacture of other glass objects, hollow or solid, which may be drawn continuously or intermittently from a mass of glass. Also that the lowering means may be arranged so that the shield sections may be entirely withdrawn together from the furnace, in case it should become desirable to place a lid or cover upon the drawing 33 of the furnace roof 35, which roof is maintained spaced above the glass bath.

Figures 14, 15:
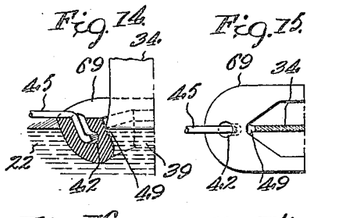
Figure 14 is a vertical end section.
Figure 15 is a partial top plan view of a modified segregating ring.

The oblong refractory ring or structure 69, shown in Figures 14 and 15, is essentially of hexagonal contour with two parallel sides greatly elongated as shown; at each end of said ring it will be noted that two walls come together at an angle. Opposite the angle thus formed, within the body of the walls at each end of the member, I provide a small channel or pocket 42 opposite the lines of jointure at the points where the sheet edges are generated; the lines may be sloping as shown, but are preferably vertical. The pockets, therefore, are at or near the floating level of the ring, which pockets also come very close to the points where the sheet edges take form; air or other temperature affecting or controlling fluid is applied through pipes 45 and directed against the inner walls of the pockets, thus avoiding undue scattering or dispersion of the heat applied, and establishing and controlling the anchoring points 49. The converging walls 49 diminish the breadth of the pool where the sheet edges take form, and assist greatly in obtaining proper viscidity and adherence of the glass at such points, thinner or proper thickness of sheet edges, while preventing the narrowing of the sheet drawn. In this case, as in the other segregating floats or members hereinto described, it will be seen that the glass pool 39 is constantly fed and renewed from the mass of molten glass 22 during drawing. This form of segregating member also may be advantageously used, in connection with the system of shield described in Figure 13, and I may then omit pipes 45, relying upon the raising and lowering of end shields 12', to regulate the temperature of the end portions of the refractory member as required. Figure 20 shows the pipe 45 inserted into the diminished channel 42, provided in the glass holding wall 21 located on each side of the sheet drawn, and which channel penetrates close to the anchoring points 49 where the sheet edges take form.

Figures 16, 17:
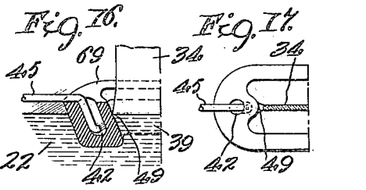
Figure 16 is a vertical end section.
Figure 17 is a partial top plan view of another modification.

Figures 16 and 17 are also sectional and top views of another hexagonal form of segregating ring, in which the meeting angular walls at each end portion of the ring are made to extend the anchoring points 49 as shown, forward into the glass of the segregated pool. These forms of anchoring points will produce reduced sheet edges more rounded in contour.

There are several factors which thus contribute to the effective drawing of a sheet of even width, and with edges of desired or reduced thickness, one of these is the small size of the recess and its nearness to the anchoring points; another is the adherence of the glass at such points, and the fact that the heat carrying medium may not be directly applied to the molten glass, thus facilitating the accuracy with which the temperature regulating fluid or medium is applied; a third is the location of said points with respect to the line or angles of the walls.

By careful attention to these factors, I am able to develop or locate at the line of jointure, specially small sharply localized points of anchorage, with due reference to the adherent glass at such points and to the floating level of the ring, the sheet edges being formed from the viscid glass at such points. The pull or stretch from such an anchorage also assists in producing comparative reduced edge thickness. Air or other temperature controlling fluid or medium is applied exactly opposite the line of jointure where the walls meet.

I thus form points of anchorage in a segregated pool rather than from a forming device, said points of anchorage being in part the body of the glass and in part the adjacent surface of the hollow-walled ring or member, and consists in affecting or maintaining required temperature of the member, or glass holding walls, by circulating a heat carrier into the hollow-walls interior of the member, or either into or upon the glass holding walls at selected points at or near the glass surface, and at points opposite to the faces of walls which are in direct actual contact with the molten glass, thereby not only avoiding unduly affecting the glass bath by heat applied to said walls or member, but obtaining a properly reduced area of viscid glass, and effecting its intensified adherence locally and precisely to the said member or walls at such points. By the terms "anchorage" or "adherence" with respect to the sheet edges where they appear, I mean that the sheet edges are prevented from receding from the points where they take form, but progress vertically as formed with the sheet during drawing, which sheet is thus drawn of uniform width.

I may use the members 69 in sections if I wish, and in Figures 18 and 19 I show desirable modifications. The pipe 45, and pocket or tube 69', which may be connected in sections, may be provided in any number, preferably one on each side of the sheet and form thereto the points of anchorage 49; they are made adjustable to change the width of the sheet drawn, to take desired position with respect to the surface of the glass, and to take proper position beneath the rolls 32 or 14 heretofore described. The refractory tube 69' surrounds the pipe 45, but it will be understood that either the tube 69' or the metal pipe 45 may be used independently when desired. In such case I prefer to use a return bent metal pipe of a form indicated in Figure 19 without the tube 69', two of these pipes being provided, one at each edge of the sheet drawn. In Figure 18, as shown, the refractory tube 69' is mounted to rotate and slide into collar 8 which is provided with set screw 2 to hold the tube in position, said collar having an arm 6 which rotates and slides horizontally in fixed bearing or collar 4, having also a set screw 2 to hold the arm fixed, thus permitting adjustment of anchoring points 49 to desired positions.

The part of the tube or of the pipe forming the points of anchorage 49, which may be of suitable form, preferably rounded, is submerged, though not far from the surface as shown, and may be adjusted to take position at or projecting slightly above the surface; this permits varying the area or surface of the points of anchorage offered to the sheet edges which are drawn from the apexes thereof, at the points of formation. It will be seen also that the points are surrounded by clear glass unaffected by proximity of the walls.

In Figure 18 the point 49 of the member is maintained immersed in close proximity to the surface of the bath, preferably with the apex of the member at the surface; the degree of immersion or position of the points with respect to the surface of the bath determines the degree of sheet anchorage.

I prefer to control the temperature of the refractory tube at anchoring point, by circulating air under pressure in chamber 42 by means of pipe 45 therein, as shown, the air pressure being controlled by means of valve 25, there being sufficient room left for the escape of the air. Before immersed or brought in contact with the glass the refractory tube is heated or conditioned to insure its adherence to the glass, thereafter the temperature may be changed as required to insure proper glass viscidity and its intensified adherence to the members at points 49. The position, dimension and form, and temperature of the portion of the members forming the points of anchorage, determine the intensity of the anchorage and thickness of the sheet edges formed at such points.

In Figure 19 I show a return bent pipe within a refractory tube 69', the end of which being immersed in the glass from above. I may omit the tube 69', and as shown in Figure 21, use at each edge forming points of the sheet, a bare metal pipe 45, preferably a seamless tubing bent upon itself to return fluid or provide a circulation for temperature affecting fluid such as air or water forced therethrough, said fluid being controlled by means of valve 25. In either case the tube or pipes are held in position by means shown in Figure 18. The diameter of the pipes may vary, preferably $\frac{1}{8}$ inch to 1 inch or more, depending upon the thickness and form of the sheet edges desired; they have suitable thickness of walls, may be round or of any form in cross section, and when oblong, the sheet edges are preferably drawn from the narrow edges thereof.

In starting the drawing, the pipes, preferably two in number, are made red hot or conditioned so that they will adhere to the portions of glass with which they contact. They are thus set apart with their bent portion in contact with the mass of glass to form the anchoring points 49. Fluid is then caused to circulate therein to regulate the temperature and intensify adherence of the glass thereto, to obtain proper anchorage for the sheet edges. The sheet glass is drawn from the glass between said points, and with the edges thereof drawn anchored at such points. Proper shielding as heretofore described is provided for the sheet during drawing.

When I use the word "points" in the present relation, I intend the word to include the meaning of place or locations without any precise restriction to areas.

The efficiency of the anchorage is dependent upon the intensity of the adhesion of the portions of glass which produce the sheet edges at anchoring points. It will be understood that the smaller the anchoring points, the faster the heat carrier must be circulated therein, this is also determined according to the speed of drawing, and to the quantities of glass from the mass fed at such points, and also as to the degree of the glass adherence or stretching to the sheet edges desired at such points. As the molten glass from beneath approaches the anchoring points, heat in due proportions is being carried away by the fluid or medium circulated within the members at said points, obtaining proper glass viscidity and adherence thereto.

The thickness of the sheet is also dependent upon the condition of the glass and the speed of the draw, the faster the speed the thinner the sheet; this is also true for the edges, and in order to obtain sheet edges of proper thickness, the speed of draw is regulated with due respect to the proportion of glass fed by the pull of hydrostatic pressure at the anchoring points, depending also to the shape of the anchoring portion of the members, and their respective temperature at the right time for proper viscidity and adherence of the glass at such points as required.

The parts and the combinations may be interchanged to any desired manner, as it is obvious I do not wish to limit myself to the precise details of the various forms shown, since the invention herein involved is capable of receiving a variety of mechanical expressions, a number of which I have shown in the drawing above described.

The aim is to provide adherent points of anchorage in a bath of glass for the edges of a continuously drawn sheet, preferably hollow members of hard material, and of proper form and dimension, so that temperature affecting medium may be circulated into their interior, affecting proper temperature by conduction through the walls of the members, precisely to an extent and points required to obtain proper viscidity and adherence of glass thereto, enabling the drawing of a sheet of glass of uniform width and with the edges thereof drawn in proper form and reduced thickness at such points.

I claim:

1. The process of drawing sheets of glass comprising variably controlling the temperature throughout the drawing area at independent local points transversely of the sheet so that the sheet drawn is of substantially uniform thickness to and including the side edges thereof.

2. The process of drawing sheets of glass comprising variably controlling the temperature throughout the drawing area at independent local points transversely of the sheet so that the sheet drawn is of substantially uniform thickness to and including the side edges thereof, and providing an anchorage for maintaining the sheet of uniform width.

3. The process of drawing sheets of glass comprising maintaining the width of the drawn sheet by creating a temperature controlled anchorage so restricted that the extreme side edges of the drawn sheet are substantially of the same thickness as the thickness of the body portions of the sheet.

4. The process of drawing sheets of glass comprising creating a restricted drawing area in the mass of molten glass, variably controlling the temperature of said drawing area at independent local points transversely of the sheet so as to produce a sheet of glass of substantially uniform thickness throughout.

5. The process of drawing sheets of glass comprising creating a restricted drawing area in the mass of molten glass, variably controlling the temperature of said drawing area at independent local points transversely of the sheet so as to produce a sheet of glass of substantially uniform thickness, and maintaining the sheet of uniform width by creating an anchorage so restricted that the extreme side edges are substantially the same thickness as the thickness of the body portion of the sheet.

6. The process of drawing sheets of glass comprising creating a restricted drawing area in the mass of molten glass, variably controlling the temperature of said drawing area at independent local points transversely of the sheet so as to produce a sheet of glass of substantially uniform thickness, and maintaining the sheet of uniform width by creating an anchorage so restricted and temperature controlled that the extreme side edges are substantially the same thickness as the thickness of the body portion of the sheet.

7. An apparatus for drawing glass comprising a furnace having molten glass therein, means for drawing a sheet of glass from said mass, and means for variably controlling the temperature throughout the drawing area at independent local points transversely of the sheet so that the sheet drawn is of substantially uniform thickness to and including the side edges thereof.

8. An apparatus for drawing glass comprising a furnace having molten glass therein, means for drawing a sheet of glass from said mass, means for variably controlling the temperature throughout the drawing area at independent local points transversely of the sheet so that the sheet drawn is of substantially uniform thickness, and means for maintaining said sheet of uniform width including anchoring devices constructed so as to form a restricted anchorage so that the edge of the sheet being drawn is of substantially the same thickness as the thickness of the body portion of the sheet.

9. An apparatus for drawing glass comprising a furnace having molten glass therein, means for drawing a sheet of glass from said mass, means surrounding and forming a restricted drawing area, and means for variably controlling the temperature within said drawing area at independent local points transversely of the sheet whereby the sheet drawn is of substantially uniform thickness.

10. An apparatus for drawing glass comprising a furnace having molten glass therein, means for drawing a sheet of glass from said mass, means surrounding and forming a restricted drawing area, means for variably controlling the temperature within said drawing area at independent local points transversely of the sheet whereby the sheet drawn is of substantially uniform thickness, and means for providing a restricted anchorage for the side edges of the sheet whereby said sheet is maintained of uniform width and the adhering side edges of the sheet are of substantially the same thickness as the thickness of the body portion of the sheet.

11. An apparatus for drawing sheet glass comprising a furnace having molten glass therein, means for drawing a sheet of glass from said mass, refractory means extending into the mass of glass at the side edges of the sheet being drawn for forming an anchorage for the sheet so that said sheet will be of substantially uniform width, and means for controlling the surface temperature of said refractory means whereby the side edges of the drawn sheet are of substantially the same thickness as the body portion of the sheet.

12. An apparatus for drawing glass comprising a furnace having molten glass therein, means for drawing a sheet of glass from said mass, refractory means extending into the mass of glass at the side edges of the sheet being drawn for anchoring the side edges of the sheet to insure that the sheet will be of uniform width, said refractory means being hollow and having an unbroken surface, and means for controlling the temperature within said refractory means so as to restrict the anchoring area of the glass and to provide a drawn sheet wherein the extreme side edges are of substantially the same thickness as the body portion of the glass.

13. An apparatus for drawing glass comprising a furnace having molten glass therein, means for drawing a sheet of glass from said mass, refractory means extending into the mass of glass at the side edges of the sheet being drawn for anchoring the side edges of the sheet to insure that the sheet will be of uniform width, said refractory means being hollow and having an unbroken surface, means for controlling the temperature within said refractory means so as to restrict the anchoring area of the glass and to provide a drawn sheet wherein the extreme side edges are of substantially the same thickness as the body portion of the glass, and means for variably controlling the temperature throughout the drawing area at independent local points transversely of the sheet whereby said sheet is of substantially uniform thickness throughout.

14. In an apparatus for drawing sheet glass, the combination of a furnace having molten glass therein, a segregating member placed in the molten glass for creating a restricted area from which the sheet is to be drawn, means for drawing the sheet from said restricted area, independent adjustable shields surrounding said restricted area for locally controlling the temperature of the glass from which the sheet is drawn whereby said restricted area may be kept at a uniform drawing temperature throughout, and means for controlling the temperature of the segregating member at diametrically opposite points and in line with the sheet being drawn whereby the glass forming the edges of the sheets is caused to adhere to said segregating member and the full width of the sheet maintained thereby throughout the drawing operation.

15. An apparatus for drawing glass comprising a furnace having molten glass therein, means for drawing a sheet of glass from said mass, and means for variably controlling the temperature throughout the drawing area at independent local points transversely of the sheet and on both sides thereof.

16. An apparatus for drawing sheet glass comprising a furnace having molten glass therein, means for drawing a sheet of glass from said mass, means extending into the mass of glass at the side edges of the sheet being drawn for forming an anchorage for the edges of the sheet, so that said sheet will be of substantially uniform width, and means for controlling the surface temperature of said anchoring means so as to form at a point at each edge of the sheet restricted anchorages so that the side edges of the sheet drawn will be of substantially the same thickness as the body portion of the sheet.

17. In an apparatus for drawing sheet glass, the combination of a furnace having molten glass therein, a segregating member placed in the molten glass for creating a restricted area from which the sheet is to be drawn, means for drawing the sheets from said restricted area, independently adjustable shields surrounding said restricted area for locally controlling the temperature of the glass from which the sheet is drawn whereby said restricted area may be kept at a uniform drawing temperature throughout, and means for controlling the temperature of the segregating member at diametrically opposite points and in line with the sheet being drawn whereby the glass forming the edges of the sheets is caused to adhere to said segregating member and the full width of the sheet maintained thereby throughout the drawing operation, said temperature controlling means being confined to a limited area whereby the thickness of the edges of the sheet being drawn is substantially the same as the thickness of the sheet throughout the body thereof.

18. In an apparatus for drawing sheet glass, the combination of a furnace having molten glass therein, a roof for the furnace with a drawing opening therein, a segregating member placed in the molten mass of glass for receiving a pool of the glass from which the sheet is drawn, and a shield on each side of the glass sheet to protect the same from the influence of the heat which circulates between said furnace roof and the surface of the glass mass, said shield adapted to engage said segregating member to entirely exclude the heat or to be suspended at variable distances thereabove in order to admit the heat to the sides of the glass.

19. In combination with a sheet glass drawing apparatus, of a tank furnace adapted to contain a bath of glass, an elongated refractory segregating ring, means for maintaining said ring immersed in proper drawing position in the bath, means for shielding the segregated glass from the furnace heat to obtain proper drawing temperature of said glass and for maintaining the sheet edge forming portions of the member at a temperature adapted to intensify adherence of the segregated portion of glass in contact therewith, and means for drawing a sheet of glass from the portion of the pool distanced from the wall of the member but with both edges of the sheet drawn from the viscid glass in adherent contact to the sheet edge forming portions of the member to retain sheet width and transparency, and to obtain sheets having edges of proper form and thickness.

20. An apparatus for drawing glass including a furnace, for reducing the glass mass to a molten state, means to segregate from the molten mass a pool from which the glass objects are drawn, and a series of independently movable shields disposed above the pool and about the space where the glass objects are drawn therefrom whereby to cut off the furnace heat from such glass objects or to admit the heat thereto in predetermined quantity.

21. An apparatus for drawing glass including a furnace for reducing the glass mass to a molten condition, and a series of shields disposed above said glass mass and about the space where the glass objects are drawn therefrom, each of said shields being independent of the companion shields and adapted to exclude entirely or admit in predetermined quantities to its respective portion of said drawing space the heat from the furnace.

22. The combination with a furnace holding a mass of glass in a molten condition having a roof with an opening through which the objects may be drawn and a heat containing space between the surface of the glass mass and said roof, of a series of independent shields for protecting the drawn objects from the heat in said heat-containing space, and flexible cords for suspending said shields through the opening in the furnace roof adapted to allow the shields to descend to entirely cut off the heat from the drawn objects and providing means to raise the shields independently to admit heat in requisite quantities to desired parts of the drawn objects.

23. An apparatus for drawing glass comprising a ring or pot adapted to take position in a bath and segregate a portion of glass for drawing, a series of shield members surrounding the drawing point and arranged to be independently raised or lowered to positions in contact with or spaced from said ring or pot.

24. In an apparatus for drawing sheet glass, the combination of a furnace containing a molten mass of glass, a member partly immersed in the mass and adapted to segregate a portion thereof, means to bring heat-controlling agents into effect at separated points in said member to raise the viscosity of the glass thereat, means for shielding the inner wall of said member and the glass pool from the furnace heat, means for moving said shielding means at desired points to admit the furnace heat, means for drawing a sheet of glass from said pool with its edges issuing out of such separated points, and a movable carrier upon which the sheet is deposited and which continues the drawing operation by applying draft to the sheet through the frictional contact of the sheet with said carrier.

25. An apparatus for the manufacture of sheet glass comprising a holder for a bath of molten glass, and temperature-controlled devices constructed so as to provide restricted anchorages to which the drawn edge portions of the sheet adhere, whereby the edge portions of the sheet will be drawn substantially of the same thickness as the thickness at the body portion of the sheet.

26. The method of making sheet glass, which consists in drawing a sheet of glass from a bath of molten glass with its drawn edge portions adhering to anchorages, cooling the anchorages to increase the adherence of the glass, and thus maintain the width of the sheet and heating the glass at the sides of the sheet edge portions to thin the edge portions of the sheet.

27. In an apparatus for drawing sheet glass, a hollow refractory member immersed in the glass parallel to the base of the sheet throughout the width thereof, and means for heating the interior of the hollow member to prevent the devitrification of the glass by undue cooling in the drawing area adjacent the walls of the hollow member.

28. In an apparatus for drawing sheet glass, a receptacle for holding a bath of molten glass, hollow means partially immersed in the glass and extending parallel with the base of the sheet, and means whereby the walls of the hollow means may be heated interiorly for preventing undue cooling of the glass along the side walls of the means on the sides of the sheet.

29. An apparatus for the manufacture of sheet glass comprising a holder for a bath of molten glass, and a double-walled segregating member lying partially immersed in the glass bath adjacent as to its side portions to the base of the drawn sheet and extending parallel to the sheet throughout the width of the sheet, and means whereby the inside of said member may be heated for preventing undue cooling of the glass in the drawing zone lying adjacent to the side portions of said member.

30. The process of drawing sheet glass from a bath of molten glass which consists in creating an area of cooler glass between refractory walls extending partially immersed in said glass bath, and heating said walls interiorly at points beneath the surface of the bath adjacent the cooler area of glass and transversely of the sheet.

31. The method of making sheet glass which consists in drawing a sheet of glass from a bath of molten glass, and independently varying the temperature of the drawn sheet above the bath at different local areas spaced on the transverse line of the sheet.

32. An apparatus for the manufacture of sheet glass comprising a holder for a bath of molten glass from which to draw the sheets, and means above the bath whereby the temperature of the drawn sheet at different areas may be independently changed on the transverse line of the sheet.

33. In apparatus for drawing sheet glass from an open bath of molten glass, anchoring means for the side edges of the drawn sheet comprising a refractory body having recesses closed to the glass and extending adjacent to the source of generation of the drawn edges of the sheet, and means extending into the recesses to modify and control the surface temperature of said body adjacent the source of generation of the sheet edges.

34. The method of drawing continuous sheet glass from a bath of molten glass which consists in maintaining the width of the drawn sheet by anchoring the edges of the sheet with adhesion upon the heated surfaces of a stationary body adjacent the surface of the bath and in continuing to draw the rising edges of the sheet with adhesion directly upon the anchoring surfaces of said stationary anchoring body to stretch the sheet and thin the edges, and applying a temperature affecting medium within said stationary body to regulate the surface temperature thereof to increase and descrease the force of anchorage and the stretching action in the sheet.

35. The method of drawing glass articles from a bath of molten glass by use of shiftable shielding means for the forming wall of the drawn articles, which consists in adjusting the drawing temperature of the drawn article by variably adjusting the position of the shielding means toward and from different local portions of the glass showing variations in drawing temperature on the transversal line of the drawn articles to compensate for said local variations in temperature whereby to obtain a drawn article with walls of substantially uniform thickness throughout.

36. In apparatus for drawing sheet glass from a bath of molten glass in a furnace, an oblong refractory member immersed in the bath to provide a layer of cooler glass in the bath from which to draw the sheet, said member lying in the bath of molten glass substantially parallel to the base of the drawn sheet, and independently adjustable shielding means on opposite sides of the sheet with the lower portions thereof spaced above said member and the bath, and means for independently raising and lowering said shielding means to either exclude or admit heat from the furnace at desired places from or to the drawing area.

37. In apparatus for drawing sheet glass from a bath of molten glass and without disturbing the horizontal stratification of the bath, a refractory body immersed in the bath for providing a layer of partially cooled glass from which to draw the sheet, anchoring means engaging the edges of the sheet to counteract the narrowing tendency of the drawn sheet and thin the edges thereof, a bending roll for the sheet, and means for drawing the sheet from said layer of cooler glass between said anchoring means and over the bending roll.

38. Apparatus for drawing sheet glass from a bath of molten glass, comprising hot stationary refractory anchoring means having a hollow space therein inaccessible to the glass of the bath, means for drawing the sheet with the ascending edge of the sheet adhering to the walls of said anchoring means, and means for applying a temperature controlling medium within said hollow anchoring means for regulating the viscosity of the glass adhering thereto to stretch the edges and counteract the narrowing tendency of the drawn sheet.

39. In apparatus for drawing glass sheets from a bath of molten glass, hot stationary anchoring means positioned to contact with the rising edges of the drawn sheet and by adhesion therewith maintain the width of the drawn sheet, and means located within said hot stationary anchoring means for varying the surface temperature thereof.

40. The process of drawing sheet glass from a bath of molten glass, which consists in maintaining the width of the drawn sheet by drawing the rising edges of the sheet with adhesion upon the hot surfaces of stationary anchoring means located adjacent the source thereof, and applying a temperature affecting medium within said anchoring means to modify the surface temperature thereof to increase or decrease the viscosity of the glass being drawn with adhesion upon the hot surfaces of said stationary anchoring means.

41. In apparatus for drawing flat sheet glass, a receptacle adapted to contain molten glass as a source from which to draw the glass, said receptacle having a restricted opening through which molten glass continually flows to the source of the glass being drawn whereby to increase the homogeneity of the glass, and means for drawing said glass in flat sheet form.

42. In apparatus for drawing sheet glass from a bath of molten glass in a furnace, means for maintaining desired width of the sheet of glass being drawn, comprising a hollow refractory member adapted to be kept at a temperature to cause the hot glass coming in contact therewith to adhere thereto, a fixed support outside said furnace including means extending therefrom for maintaining said refractory member in fixed position with the edge of the sheet being drawn within the furnace, and means for applying a cooling medium to the inner surface of said hollow refractory member to regulate the viscosity of the glass passing in adherent contact to said fixed hollow refractory member to counteract the narrowing tendency of the sheet.

43. In apparatus for drawing glass sheets, from a bath of molten glass, a container for the molten glass having oppositely disposed walls, means for drawing the sheet upwardly from said bath with the edges thereof taking form from portions of the bath adjacent to said walls and means for locally applying additional heat within said walls in proximity to the source of the drawn edges of the sheet for counteracting tendencies to excess cooling and devitrification of the glass at such points.

In testimony whereof, I affix my signature.

ARTHUR E. SPINASSE.